United States Patent
Sato et al.

[15] 3,687,213
[45] Aug. 29, 1972

[54] SAFETY METHOD AND APPARATUS FOR VEHICLE PASSENGERS

[72] Inventors: Kazuo Sato; Tomio Hisatsune, both of Toyota, Japan

[73] Assignee: Toyota Jidosha Kogyo Kabushiki Kaisha, Toyota-shi, Japan

[22] Filed: Sept. 10, 1970

[21] Appl. No.: 70,692

[30] Foreign Application Priority Data

Oct. 8, 1969 Japan ...................44/79993
Oct. 8, 1969 Japan ...................44/79994

[52] U.S. Cl. ...............180/82, 280/150 AB, 180/98, 180/103, 343/7 ED
[51] Int. Cl. ...........................................B60r 21/08
[58] Field of Search ....280/150 AB; 180/82, 98, 103; 343/7, 112

[56] References Cited

UNITED STATES PATENTS

| | | | |
|---|---|---|---|
| 3,420,572 | 1/1969 | Bisland | 343/7 |
| 3,187,328 | 6/1965 | Vetter | 343/7 |
| 2,974,304 | 3/1961 | Nordlund | 180/82 X |
| 2,851,120 | 9/1958 | Fogiel | 343/112 |
| 3,442,347 | 5/1969 | Hodgson et al. | 180/98 |
| 3,448,822 | 6/1969 | LaLone et al. | 180/98 |
| 3,450,414 | 6/1969 | Kobori | 280/150 |

Primary Examiner—Kenneth H. Betts
Attorney—McGlew and Toren

[57] ABSTRACT

In a method for protecting passengers in a moving vehicle, radio signals having a predetermined propagation speed and frequency are transmitted from the moving vehicle to an approaching object, such as a second vehicle. Radio signals reflected from the approaching object, and having a different frequency, are received in the moving vehicle. The difference frequency corresponding to the relative speeds between the two vehicles or between the moving vehicle and an object is obtained by utilizing the change in frequency of both signals caused by the Doppler effect, and the level of the reflected signal, corresponding to the distance between the moving vehicle and the approaching object, is concurrently determined. The time remaining before collision of the moving vehicle with the object or another moving vehicle, if the moving vehicle and/or the other vehicle keep advancing, is determined by multiplying the difference frequency by the level of the reflected signal, to produce a signal inflating air bags within such remaining time. The apparatus comprises means for transmitting and receiving radio signals, means for obtaining the difference frequency between the transmitted and reflected signals, a converter operable to convert the difference frequency to an electrical quantity, such as a voltage, and a converter operable to convert the level of the reflected signal to an electrical quantity, such as a second voltage. The apparatus further includes a multiplier to multiply the two electrical quantities to produce actuating signals when the multiplied value exceeds a predetermined value of the remaining time, and includes means for inflating the air bags, responsive to the actuating signals, within the remaining time.

10 Claims, 12 Drawing Figures

INVENTORS
KAZUO SATO
TOMIO HISATSUNE
BY McGlew and Toren
ATTORNEYS

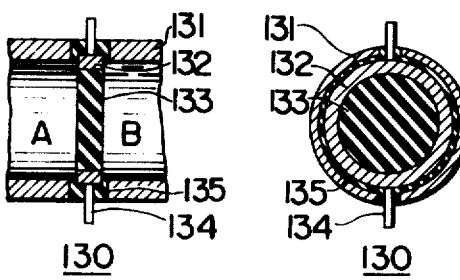
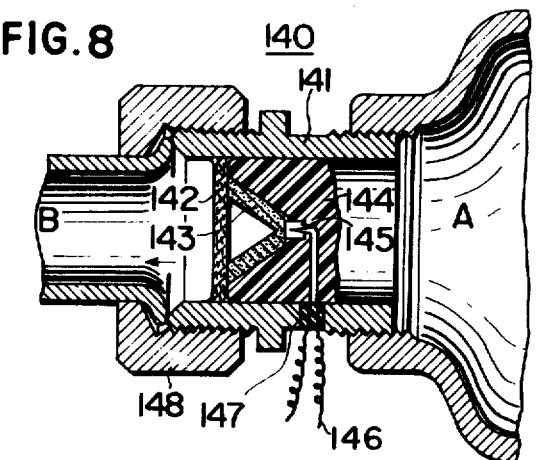
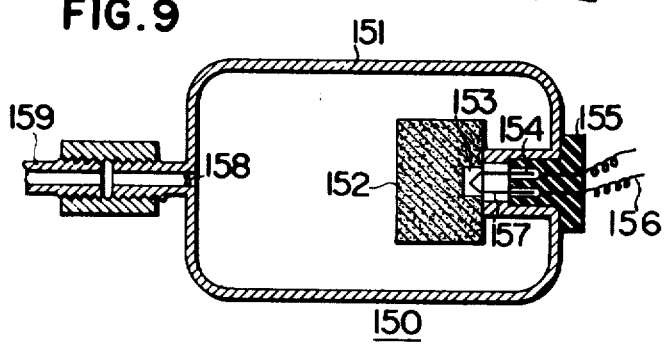

3,687,213

SAFETY METHOD AND APPARATUS FOR VEHICLE PASSENGERS

BACKGROUND OF THE INVENTION

In the event of a collision of a moving vehicle with a stationary object or with another moving vehicle, passengers will be thrown forward against portions of the moving vehicle, due to the inertia of the passengers, resulting in serious and possibly fatal injuries. To prevent such injuries, it has been proposed to utilize inflatable air bags installed in a vehicle at locations which a passenger is most likely to contact, in the event of a collision, and these air bags are inflated instantaneously at the moment of the collision to provide a cushion to protect the passenger from injury.

In one known arrangement, an impact detecting unit is provided on the vehicle to initiate operation of this safety arrangement. In this known arrangement, gas is supplied to an air bag, to inflate the air bag, only at the time when the impact detecting unit is triggered by the shock resulting from the occurrence of a collision. However, the inflation of the air bag must be completed before a passenger is brought into direct contact with the vehicle body, because the distance between the passenger and relatively rigid parts of the vehicle body in front of the passenger is only several tens of centimeters. This requirement is fulfilled by utilizing a rapid inflation action, such as produced by the explosion of gunpowder, for example. When the inertia of the passenger is large, however, such rapid inflation of an air bag is likely to cause secondary injury to the passenger.

SUMMARY OF THE INVENTION

This invention relates to safety or protective measures for vehicle passengers in the event the vehicle is involved in a collision with either a stationary or a moving object. More particularly, the invention is directed to a method and apparatus for protecting vehicle passengers from injury and in which the imminence of a collision is detected in advance of the collision and air bags are inflated before the passenger can contact with the interior of the vehicle body.

In accordance with the invention, a narrow beam signal is transmitted from the moving vehicle at a first frequency, and the signal reflected from a stationary or moving object, which the moving vehicle is approaching, and which has a second frequency, is received in the moving vehicle. The difference frequency between the two signals, corresponding to the Doppler effect, is determined, and the level of the reflected signal is also determined. The two determined signals, converted into suitable electric quantities, such as voltages, are multiplied to produce an actuating signal for effecting inflation of air bags within the time period remaining before actual occurrence of the collision.

The apparatus of the invention further includes means inhibiting inflation of the air bags in the event that the speed of the moving vehicle is very low, and includes other means limiting the maximum value of the actuating signal. The actuating signal is utilized to rupture a diaphragm separating a container of gas under pressure from the air bags, or may be utilized to trigger active a gas generator to inflate the air bags.

An object of the invention is to provide a method of protecting vehicle passengers, in which inflation of an air bag is completed in advance of an imminent collision and before a passenger is thrown forward by the collision.

Another object of the invention is to provide such a method in which an imminent collision is detected in advance of the collision and cushioning air bags are inflated within a predetermined time period before a collision.

Another object of the invention is to provide apparatus for detecting an imminent collision and inflating cushioning air bags, to protect passengers in a moving vehicle, before the collision actually occurs.

For an understanding of the principles of the invention, reference is made to the following description of typical embodiments thereof as illustrated in the accompanying drawings:

BRIEF DESCRIPTION OF THE DRAWINGS

In the drawings:

FIGS. 7a and 7b are, respectively, a longitudinal sectional view and a transverse sectional view of one form of gas valve embodying the invention;

FIG. 8 is a longitudinal sectional view of another form of gas valve embodying the invention; and FIG. 9 is a longitudinal sectional view of one form of gas generator embodying the invention.

DESCRIPTION OF THE PREFERRED EMBODIMENTS

Figure 1:
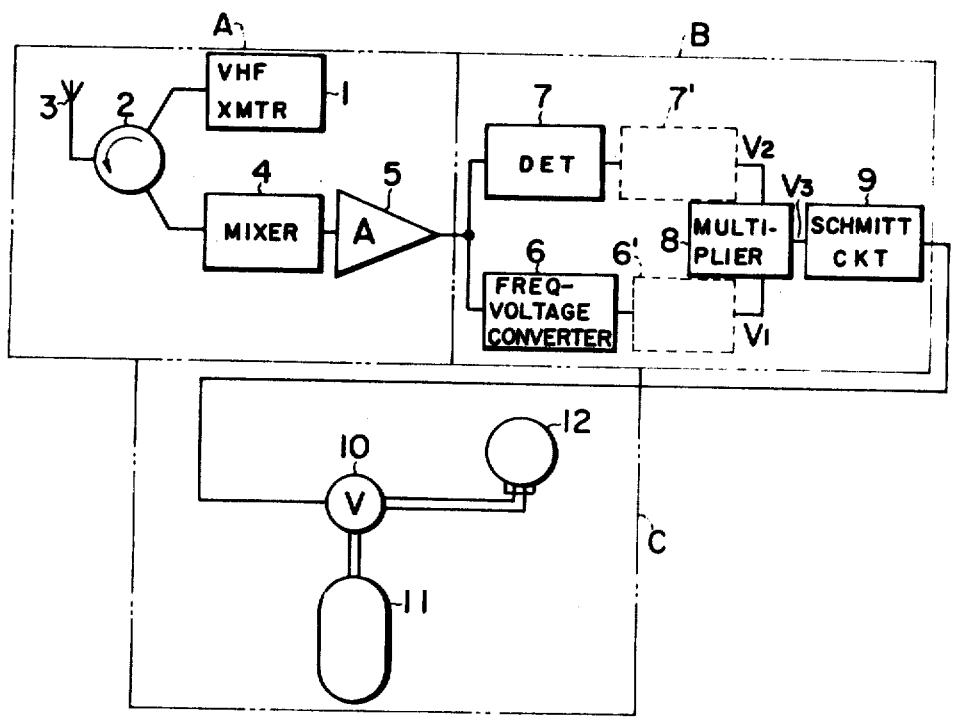
FIG. 1 is a simplified block diagram of apparatus for performing the method of the invention.

When radio signals, such as audio frequency or radio frequency waves, having a frequency $f_1$ are transmitted from a vehicle, the relation of this frequency $f_1$ with the frequency $f_2$ of radio signals reflected from an approaching vehicle, with the relative speed of the two vehicles being indicated by $v$, is as follows:

$$f_2 = \frac{c+v}{c-v} f_1 \tag{1}$$

In the above equation, $c$ is the propagation speed of the radio signal.

The difference frequency $f_d$ between frequencies $f_1$ and $f_2$, hereinafter referred to as the frequency of the Doppler signal, is calculated from the above equation as follows:

$$f_d = f_2 - f_1 \doteq \frac{2v}{c} f_1 = k_1 v \tag{2}$$

Since the propagation speed $c$ and the frequency $f_1$ of the transmitted radio signal are predetermined, the frequency $f_d$ of the Doppler signal is proportional to the sum of the speeds of the two vehicles, that is, the relative speed $v$. In the above equation (2), $k_1$ is a proportional constant and $v$ is the relative speed of approach of the two vehicles toward each other.

It is generally stated that the level of the Doppler signal is inversely proportional to the fourth power of the distance when the distance between two vehicles is large, and that this level becomes inversely proportional to the cube or square of the distance as the distance between two vehicles decreases. It has been confirmed that the level of the Doppler signal is inversely proportional to the distance when the distance between the vehicles is very small, such as a distance of less than 10m, which is the operational range for which the present invention is intended.

In other words, the level $G$ of the Doppler signal with relation to the distance $D$ may be expressed as follows:

$$G = k_2/D$$

where $k_2$ is a constant.

In accordance with the present invention, an electrical quantity proportional to the frequency $f_d$ of the Doppler signal and an electrical quantity proportional to the lever $G$ of the Doppler signal are determined. Then the product $S$ of the two electrical quantities is obtained as follows:

$$S = f_d \times G = k_1 k_2 \cdot \frac{v}{D} = k \cdot \frac{1}{T} \qquad (4)$$

where $k$ is a constant and $T$ is equal to $D/v$. Stated another way, $T$ represents the value obtained by dividing the distance by the relative speed, and thus indicates the time remaining until an imminent crash occurs if both vehicles keep moving in the same manner. Thus, if a particular signal can be produced before the remaining time $T$ is decreased below a predetermined value, the passenger protecting apparatus can be activated well before the vehicles crash. This means the time when the product $S$ exceeds a certain value in equation (4). At this time, the particular signal should be developed. If the relative speed is high, the product $S$ exceeds a predetermined value when the distance is correspondingly large. In the end, the signal is produced at a predetermined remaining time without relation to the relative speeds of the vehicles.

As may be seen from equation (4), even if the relative speed $v$ is very low, the product S will exceed a predetermined value provided that the distance D becomes correspondingly smaller. In this case, if a vehicle is involved in an accident, the damage to the vehicle body will be very slight and substantially no injuries will occur to passengers. Under this condition, it is not necessary to produce signals, and consequently actuation of the safety apparatus is not necessary. Therefore, it is desirable to provide non-actuating zone characteristics for the first electrical quantity proportional to the relative speed of the vehicles, or to provide an upper limit for the second electrical quantity which is inversely proportional to the distance between the vehicles. This prevents production of signals when the relative speed is lower than a predetermined value or the distance between the vehicles is smaller than a predetermined value.

Referring to FIG. 1, a VHF transmitting, receiving and mixing unit is indicated at A, a Doppler logical operation unit is indicated at B, and an air bag actuating unit is indicated at C. Transmitting, receiving and mixing unit A comprises a VHF transmitter 1, a directional coupler 2, a transmitting and receiving antenna 3, a mixer 4, and an amplifier 5. The VHF energy emitted from transmitter 1 is radiated from antenna 3 through coupler 2, and antenna 3 has an appropriate directional characteristic and transmits electric waves over a certain beam width. The wave reflected from an approaching object is received by antenna 3 and directed through coupler 2 to mixer 4, where a part of the output of transmitter 1 is mixed with the reflected wave. Thereby, there is derived the Doppler signal having the difference frequency between the mixed waves, and this Doppler signal is amplified to a desired value by amplifier 5.

Logical operation unit B comprises a frequency-voltage converter 6, a detector 7, a multiplier 8, and a Schmitt circuit 9. The amplified Doppler signal is converted, by converter 6, to a DC voltage $V_1$ which is proportional to the frequency. Simultaneously, the signal is converted by detector 7 to a DC voltage $V_2$ which is proportional to the level of the signal. The two DC voltages $V_1$ and $V_2$ are multiplied by multiplier 8 and, when the output voltage $V_3$ of multiplier 8 exceeds a predetermined value in Schmitt circuit 9, respective actuating signals are produced.

Air bag actuating unit C comprises a valve 10, a non-inflammable-gas container 11 and an air bag 12. Valve 10 is opened by the actuating signal from circuit 9, to deliver gas from container 11 into air bag 12 to inflate the air bag to prevent impact between a passenger and the vehicle body.

As will be clear from the foregoing description, voltage $V_1$ corresponds to the electrical quantity proportional to the frequency $f_d$ of the Doppler signal as derived in equation (2), and voltage $V_2$ is the electrical quantity proportional to the level G of the Doppler signal, as derived in equation (3). Consequently, the output voltage $V_3$ of multiplier 8 is proportional to the product S derived by equation (4). When this output voltage exceeds a predetermined value, this indicates that the time remaining before an imminent collision has decreased below a predetermined value. This remaining time is so set as to be sufficiently long to permit opening of valve 10 by the signal from circuit 9, resulting in inflation of air bag 12. Usually, this time is set at 100 or 200ms.

The components 6' and 7' shown in broken lines in the logical operation unit are, respectively, a non-actuating circuit and an upper limiter circuit. When the relative speed between the vehicles is very low, circuit 6' blocks the output $V_1$ of converter 6, or reduces it to nearly zero. Circuit 7' limits the maximum output of detector 7 when the distance between the vehicles is very small, for example, less than 10cm. Thus no signal is provided from circuit 9 when the relative speed is in the range where no physical damage is to be expected from a collision, or in the range where the distance between the vehicles is too small to measure.

Figure 2:
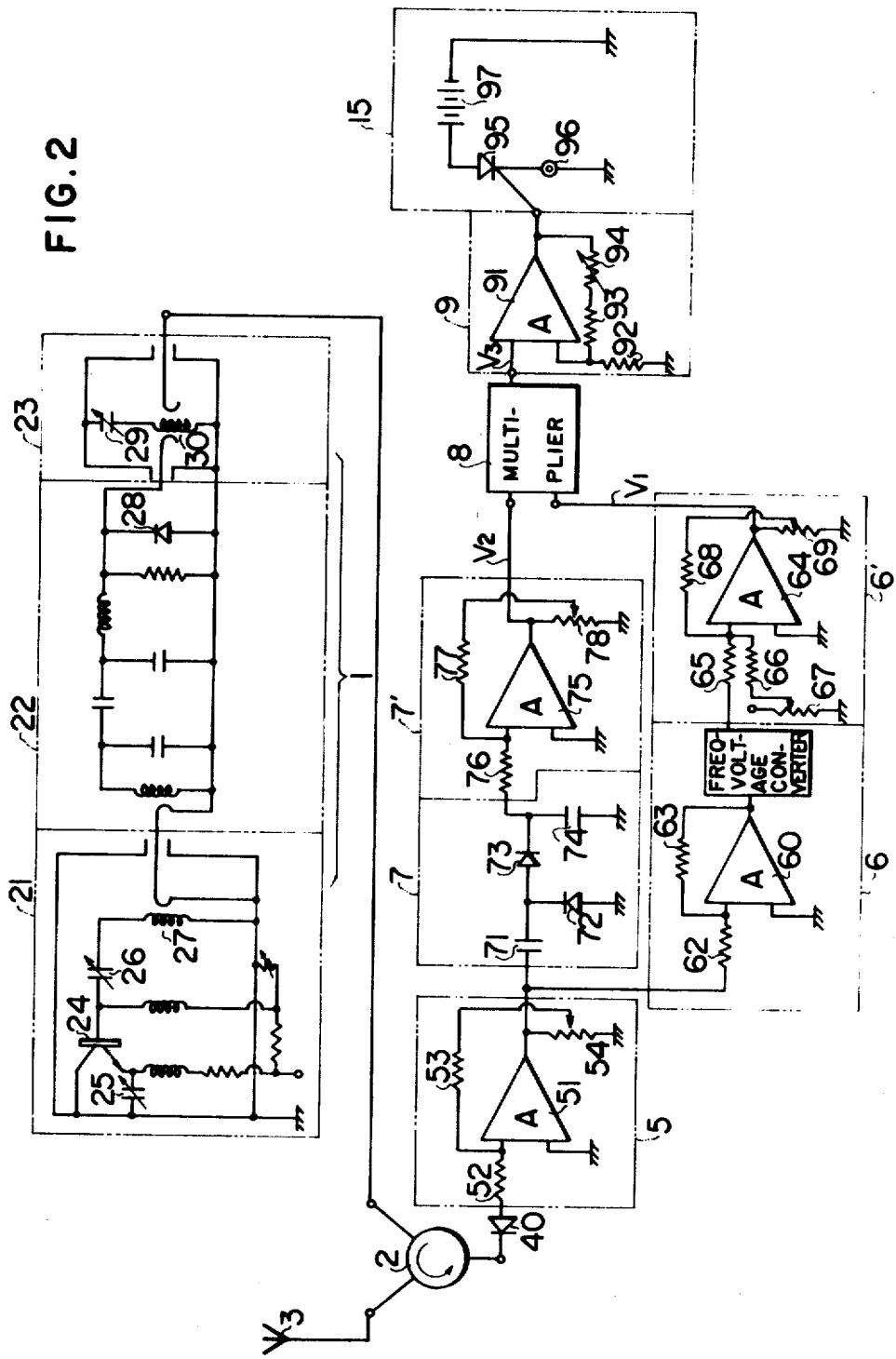
FIG. 2 is a schematic wiring diagram of the apparatus shown in FIG. 1.

In FIG. 2, which is a detailed schematic wiring diagram of the circuitry shown in FIG. 1, parts corresponding to those in FIG. 1 have been identified by the same reference characters. VHF transmitter 1 comprises an oscillator 21, a multiplier 22 and a coaxial resonator 23. Oscillator 21 includes an oscillating transistor 24, resonating capacitors 25 and 26, a resonating winding or coil 27, and associated components. The signal, with the initial frequency $f_1$, is directed from oscillator 21 to the idler circuit of multiplier 22, which multiplier comprises a plurality of coils and capacitors, and high harmonics are produced by means of a Varactor diode 28 having non-linear characteristics and which is provided at the output side of the idler circuit. High harmonics of a specific order are taken out at the coaxial resonator 23 by means of a resonating circuit comprising a variable capacitor 29 and a winding 30. The high harmonics, thus taken out, are directed into the directional coupler 2.

A mixing diode is indicated at 40 and, by utilizing the non-linear characteristics of diode 40, the Doppler signal, having the difference frequency $f_d$ between the output signal of transmitter 1 and the signal reflected from an approaching vehicle, is obtained. This Doppler signal is amplified by a linear amplifier 5 consisting of an amplifier 51, an input resistor 52, a negative feedback resistor 53 and a gain regulating resistor 54. The amplified Doppler signal is fed to the respective inputs of detector 7 and converter 6.

Converter 6 comprises a saturation amplifier including an amplifier 60, an input resistor 62, a negative feedback resistor 63 and a frequency-voltage converter, by means of which a DC voltage, proportional to the frequency of the Doppler signal, is obtained. The output of converter 6 is directed into non-actuating zone circuit 6'. When the output is higher than a predetermined value, the voltage $V_1$, having the specified mark and a value corresponding to the frequency of the Doppler signal, is obtained. Non-actuating zone circuit 6' comprises a linear amplifier including an amplifier 64, resistors 65, 68 and 69, and a bias circuit comprising resistors 66 and 67. The width of the non-actuating zone 6' is determined by adjusting resistor 67 in accordance with the voltage to be applied to the bias circuit.

The Doppler signal supplied to detector 7 is rectified by a voltage doubler circuit, comprising capacitors 71 and 74 and diodes 72 and 73, into a DC voltage proportional to the level of the Doppler signal. Component 7' is a saturation amplifier which acts as an upper limiter and which comprises an amplifier 75 and resistors 76, 77 and 78. When its input voltage is higher than the predetermined value, the output is limited to a constant value.

The DC voltages $V_1$ and $V_2$ are directed into multiplier 8, which produces a voltage $V_3$ proportional to the product of the voltages $V_1$ and $V_2$. By way of example, multiplier 8 may comprise a Hall generator. Voltage $V_3$ is directed into Schmitt circuit 9 comprising an amplifier 91 and positive feedback resistors 92, 93 and 94. When voltage $V_3$ exceeds a predetermined value, an output actuating signal is produced and delivered to actuating circuit 15 which comprises a thyristor 95 and a battery 97, which produce a current flow through a fusible element 96 to fuse the latter. Thyristor 95 is triggered conductive by the output signal of Schmitt circuit 9 which is supplied to its gate. When element 96 is fused, valve 10 of FIG. 1, for example, is opened and the non-inflammable gas is delivered into air bag 12 to inflate the air bag.

Figure 3:
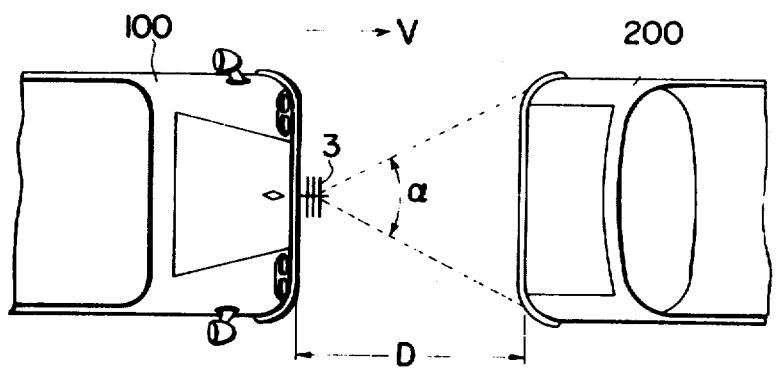
FIG. 3 is a plan view illustrating the relation between two vehicles prior to a collision.

FIG. 3 illustrates a moving vehicle 100 provided with the transmitting and receiving antenna 3, and illustrates a second vehicle 200 which is moving either ahead of vehicle 100 or toward vehicle 100. The relative speed of the two vehicles is indicated by V and the distance therebetween by D. The beam angle of the wave radiated by antenna 3 is indicated at $\alpha$.

Figure 4B:
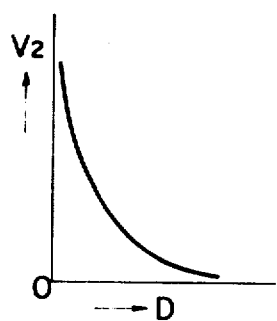
FIG. 4b is a graphic illustration of the relation between the level of a Doppler signal and the distance between two vehicles on a collision course.
Figure 4A:
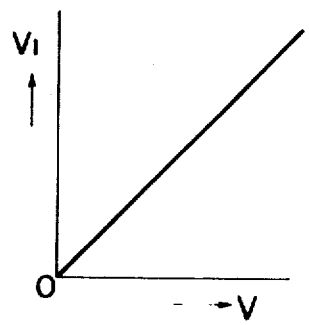
FIG. 4a is a graphic illustration of the relation between the frequencies of a Doppler signal and the relative speed between two vehicles on a collision course.

FIGS. 4a and 4b illustrate the characteristics of the voltages $V_1$ and $V_2$ which change in relation to the mentioned variables. FIG. 4a illustrates voltage $V_1$ which is proportional to the relative speed V, and FIG. 4b illustrates the voltage $V_2$ which is inversely proportional to the distance D between the vehicles. As seen from equations (2) and (3), voltages $V_1$ and $V_2$ are proportional, respectively, to the frequency and to the level of the Doppler signal, and are obtained by the apparatus illustrated in FIGS. 1 and 2.

Figure 5A:
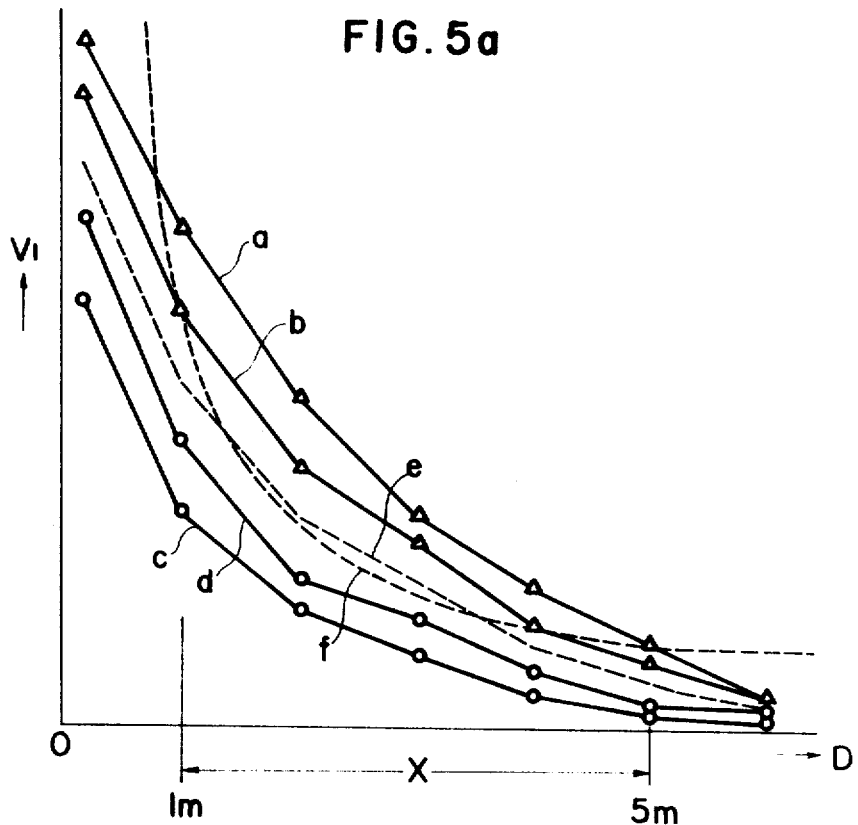
FIG. 5a is a graphic illustration of measured characteristics of approaching vehicles of different kinds, corresponding to FIG. 4b.
Figure 5B:
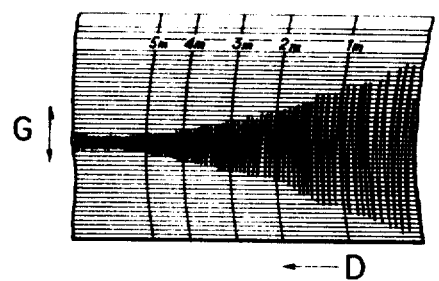
FIG. 5b is a graphic illustration of an actually measured Doppler signal.

In FIG. 5a, which illustrates measured values of the voltage $V_1$, curves $aa$ and $b$ show the voltage level of the Doppler signal produced by transmitted waves reflected from a large truck. Curves $c$ and $d$ show the voltage level of the Doppler signal in the case of a small passenger vehicle, and curve $e$ illustrates the mean value of these four measured values. Curve $e$ nearly agrees with the inversely proportional curve $f$ obtained by selecting appropriately the proportional constant in the practical range of vehicle distances of 1 to 5m. FIG. 5b illustrates the actual waveform of the measured Doppler signal.

It will be clear from FIGS. 5a and 5b that the level G decreases nearly inversely with the increase in the distance D. The range where the level G is significantly changed with the change in the distance D corresponds to the distance range where the beam angle $\alpha$ becomes narrower than the width of an oncoming or approaching vehicle, as shown in FIG. 3.

Figure 6:
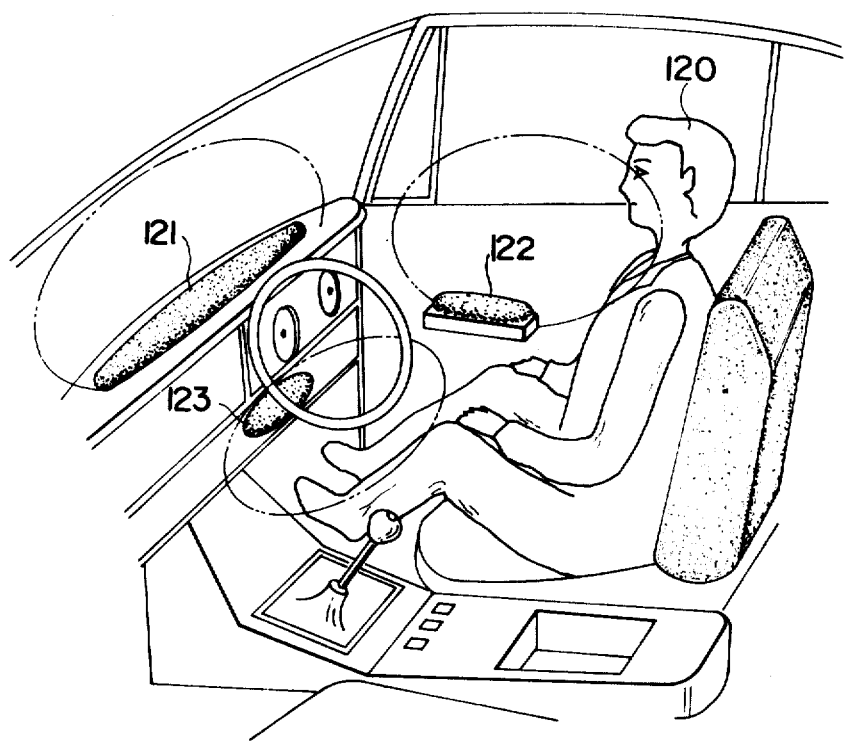
FIG. 6 is a perspective view illustrating the arrangement of air bags in a vehicle body.

FIG. 6 illustrates the manner in which air bags are installed in a vehicle. As shown in this figure, air bags 121 and 123 are arranged in the upper and lower portions of the front panel, and a third air bag 122 is located on the arm rest of the door. A passenger is indicated at 120. The air bags are inflated as shown in broken lines, to prevent the passenger from striking against the vehicle body when he is thrown forward.

FIGS. 7a and 7b illustrate one form of gas valve 130 corresponding to the valve 10 illustrated in FIG. 1. In these figures, a pipe is indicated at 131 and a ring of fusible metal, such as a lead-tin alloy, is illustrated at 132. An insulating partition wall 133 is installed within ring 132, and electrodes 134 are provided at the top and bottom of ring 132, with an insulator 135 supporting ring 132 in pipe 131. Upon receipt of an actuating signal from Schmitt circuit 9 of FIG. 1, electric current flows between electrodes 134 to fuse ring 132, as a result of which partition wall 133 is pushed out by the gas pressure to connect the space A with the space B. Thus, non-inflammable gas is delivered into the air bags as gas valve 130 is opened, and inflates the air bags within a predetermined period of time which is determined by the time the actuating signal is produced.

Another form of gas valve is illustrated in FIG. 8, in which valve 140 is provided between gas container A and pipe B leading to the air bags. Valve 140 comprises an intermediate pipe 141, a partition wall 142, a frustoconical layer of gunpowder 143, a damp-proof coating agent 144, an electric detonator 145, lead wires 146, an insulating seal 147 and a coupling 148. The actuating signal from the Schmitt circuit causes an electric current to flow through lead wires 46 to ignite detonator 145, thus detonating gunpowder layer 143. The detonation of this gunpowder layer effectively destroys partition wall 142 and, at the same time, blows off the coating agent 144, thus allowing delivery of high pressure gas from container A to pipe B.

FIG. 9 illustrates one typical embodiment of a gas producer 150 which comprises a container 151, gunpowder 152 for generating gas, an electric detonator 153, an electrode 154, a plug 155, lead wires 156, a seal 157, a dampproof film 158, a pipe 159, and other associated parts. This producer is supplied with electric current through lead wires 156 responsive to the actuating signal from the Schmitt circuit, to ignite detonator 153. Thereby, gunpowder 152 burns and develops a high pressure gas. The damp-proof film 158 is broken by the gas pressure, so that the high pressure gas is delivered through the pipe 159 into the air bag (not shown) to inflate the latter rapidly. Since inflation of the air bag is completed just before the vehicle collides, secondary injury to the passengers is avoided.

Summarizing, in accordance with the invention, actuating signals are produced within a predetermined period of time before an imminent collision, to inflate air bags without delay. The actuating signal producing time is so selected as to assure the necessary time for the inflation of the air bags, without relation to the colliding speed of the vehicles. Consequently, inflation of the air bags can be completed before a passenger is thrown forward, due to his inertia, thus preventing impacting of a passenger on the vehicle body without incurring any unnecessary injury to the passenger.

While specific embodiments of the invention have been shown and described in detail to illustrate the application of the principles of the invention, it will be understood that the invention may be embodied otherwise without departing from such principles.

What is claimed is:

1. A method of protecting passengers in a moving vehicle, upon collision of the moving vehicle with a fixed object or with another moving vehicle, said method comprising the steps of transmitting radio signals, having a first frequency, from the moving vehicle; receiving, in the moving vehicle, the reflected radio signals, having a second frequency, from an object in the path of the moving vehicle; producing a first electrical quantity proportional to the difference frequency between the transmitted and reflected radio signals; producing a second electrical quantity proportional to the level of difference frequency; multiplying said electrical quantities to produce an actuating signal when the product of said electrical quantities exceeds a predetermined value; and utilizing said actuating signal to activate inflatable passenger protecting means in advance of the collision of the moving vehicle with an object in its path.

2. A method of protecting passengers in a moving vehicle, as claimed in claim 1, including the step of providing a non-actuating zone characteristic for said first electrical quantity.

3. A method of protecting passengers in a moving vehicle, as claimed in claim 1, including limiting the upper value of said second electrical quantity.

4. Safety apparatus for protecting passengers in a moving vehicle upon collision of the moving vehicle with another vehicle or with an object in its path, said safety apparatus comprising, in combination, transmitting means operable to transmit radio signals, having a first frequency, toward an object in the path of the moving vehicle; receiving means on the moving vehicle receiving radio signals reflected from the object and having a second frequency; mixer means connected to said transmitting and receiving means and deriving the difference frequency between the transmitted and reflected signals; converter means connected to said mixer means to provide a first electrical quantity proportional to said difference frequency; detector means connected to said mixer means to provide a second electrical quantity proportional to the level of said difference frequency; multiplier means connected to said converter means and to said detector means to provide a third electrical quantity proportional to the product of said first and second electrical quantities; actuating signal producing means connected to said multiplier means and producing an actuating signal when said third electrical quantity exceeds a predetermined value; passenger protecting inflatable air bags in said moving vehicle; and means connected to said actuating signal producing means and operable, responsive to said actuating signal, to inflate said air bags in advance of collision of the moving vehicle with an object in its path.

5. Safety apparatus for protecting passengers in a moving vehicle, as claimed in claim 4, including means connected between said converter means and said multiplier and operable to render said actuating signal producing means ineffective when the speed of the moving vehicle or the distance between the moving vehicle and an object in its path are less than predetermined values.

6. Apparatus for protecting passengers in a moving vehicle, as claimed in claim 4, including limiting means connected between said detector means and said multiplier and limiting said second electrical quantity to a predetermined upper level.

7. Apparatus for protecting passengers in a moving vehicle, as claimed in claim 4, in which said actuating signal producing means is a Schmitt trigger circuit.

8. Apparatus for protecting passengers in a moving vehicle, as claimed in claim 4, in which said air bags are connected to a source of gas under pressure by a normally closed valve; said actuating signal initiating rupture of said valve.

9. Apparatus for protecting passengers in a moving vehicle, as claimed in claim 4, including a normally inactive gas generator connected to said air bags; said actuating signal effecting activation of said gas generator.

10. Apparatus for protecting passengers in a moving vehicle, as claimed in claim 4, in which said radio signals are transmitted in a narrow beam directed forwardly of the moving vehicle.

* * * * *